United States Patent [19]

Organi

[11] 4,420,970
[45] Dec. 20, 1983

[54] APPARATUS FOR CHECKING FOR LEAKS FROM METAL-CLAD HIGH-TENSION ELECTRIC GEAR

[75] Inventor: Henri Organi, Villeurbanne, France

[73] Assignee: Alsthom-Atlantique, Paris, France

[21] Appl. No.: 251,441

[22] Filed: Apr. 6, 1981

[30] Foreign Application Priority Data

Apr. 17, 1980 [FR] France ............... 80 08591
Sep. 16, 1980 [FR] France ............... 80 19904

[51] Int. Cl.³ .......................................... G01M 3/26
[52] U.S. Cl. ........................................ 73/46; 73/49.8
[58] Field of Search ................... 73/46, 40, 49.8; 220/116, 235, 237, 327; 277/2, 29, 112

[56] References Cited

U.S. PATENT DOCUMENTS 4,019,371 4/1977 Chaplin et al. ................... 73/46
4,140,040 2/1979 Modrey ..................... 220/327 X

FOREIGN PATENT DOCUMENTS 752354 9/1933 France .
992862 10/1951 France .
1204791 1/1960 France ........................ 73/40
1370643 7/1964 France .
854189 11/1960 United Kingdom ........ 73/46

Primary Examiner—S. Clement Swisher
Assistant Examiner—Joseph W. Roskos
Attorney, Agent, or Firm—Sughrue, Mion, Zinn, Macpeak & Seas

[57] ABSTRACT

Apparatus for checking for leaks between the connection flanges of two portions of metal-clad electric gear, said flanges being sealed by means of two seals disposed concentrically in series on the facing surfaces of the flanges, the electric gear being filled with compressed gas, wherein the internal volume (10) lying between the two seals (6, 7) communicates with a smooth hole (11, 24) which itself communicates to the outside, the smooth hole being plugged by a resilient seal (18).

18 Claims, 9 Drawing Figures

APPARATUS FOR CHECKING FOR LEAKS FROM METAL-CLAD HIGH-TENSION ELECTRIC GEAR

The invention relates to apparatus for checking for leaks from metal-clad high-tension electric gear containing a dielectric gas under pressure.

BACKGROUND TO THE INVENTION

Metal-clad electric gear insulated by gas under pressure, e.g. sulphur hexafluoride, must remain hermetically sealed for many months and, even, years, without it being necessary to top up the quantity of gas. One technique is to use two seals placed in series along a leakage path. This considerably reduces the danger of leakage. Another technique is to check whether the most interior seals of a unit are really effective by measuring the leaks in the volume situated between the two seals. This is done by providing a hole in the flange which hole communicates firstly with the outside and secondly in the zone situated between the two seals, the outside orifice being normally closed and sealed by a bolt which clamps a seal.

Preferred embodiments of the invention provide apparatus for checking for leaks between components of metal-clad electric gear containing gas under pressure which checking apparatus requires only simplified machining and whose price is consequently competitive.

SUMMARY OF THE INVENTION

The invention provides apparatus for checking for leaks between the connection flanges of two portions of metal-clad electric gear, said flanges being sealed by means of two seals disposed concentrically in series on the facing surfaces of the flanges, said electric gear being filled with compressed gas, wherein the internal volume lying between the two seals communicates with a smooth hole which itself communicates to the outside, said smooth hole being plugged by a resilient seal.

According to a first embodiment the smooth hole is provided in the periphery of one of the flanges.

In one variant, there is an insulator inserted between the two flanges and the smooth hole is located in the periphery of the insulator, and communicates between the outside and internal volumes between serially arranged sealing rings on both sides of the insulator. The smooth hole in the insulator is formed by a moulding core when the insulator is cast and the seal rings of the facing surfaces are disposed in grooves formed in the insulator.

Advantageously, at least one of the components of the group constituted by the smooth hole and the elastic seal is notched so that a leak is produced when the screw is loosened.

The notch is provided either in the seal on the side nearest the internal volume or on the end of the hole situated on the side nearest the outside of the metal casing.

In a particular embodiment of the apparatus the origin of leakage can be detected, in which case the apparatus includes a pipe to make one of the holes communicate with the pressure gauge, the pipe including means for closing the other hole.

BRIEF DESCRIPTION OF THE DRAWINGS

The invention is described in greater detail hereinbelow with reference to several embodiments illustrated in the accompanying drawings in which.

DETAILED DESCRIPTION

Figure 1:
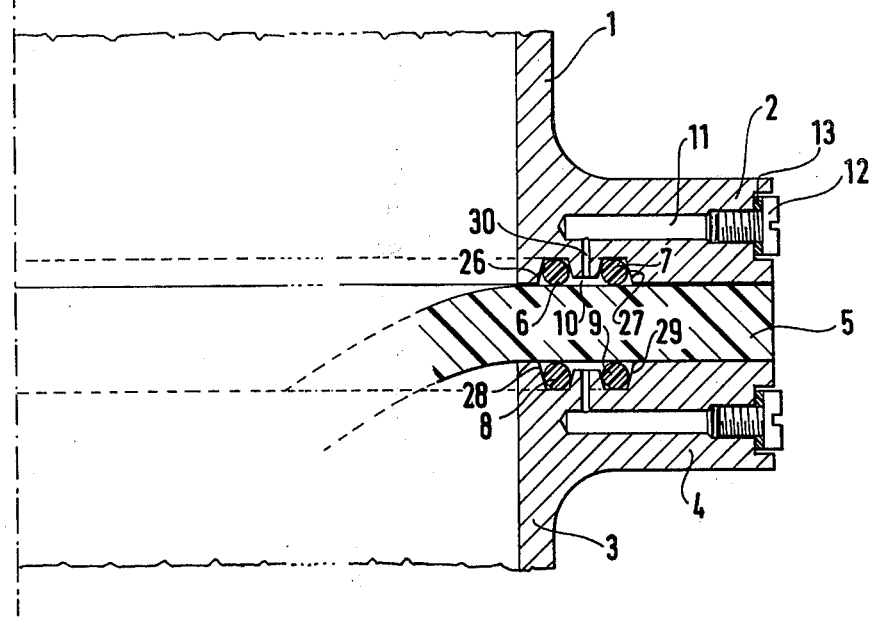
FIG. 1 is a partial schematic cross-section illustrating a flange connection which includes leak checking apparatus in accordance with the prior art.

The assembly in accordance with the prior art and illustrated in FIG. 1 includes tubes 1 and 3 each of which has a fixing flange 2 and 4. A disk-shaped or conical insulator 5 is inserted between the two flanges 2 and 4 which are bolted together, the bolts (not shown) passing through holes in the periphery of each flange. The insulator 5 itself constitutes an intermediate tube between the flanges of the tubes 1 and 3. Sealing between the flanges 2 and 4 is provided by two pairs of O rings 6, 7 and 8, 9 placed concentrically in series going outwardly from the inside of the tubes and are recessed in grooves 26, 27 and 28, 29 formed in the facing surfaces of the flanges 2 and 4. The two grooves such as 26 and 27 on the same flange communicate together. This forms a volume such as 10 between the inner O ring 6 and the outer O ring 7.

A radial hole 11 in the flange 2 is used to check for possible leakage at the seal 6, which leakage would cause an increase in pressure in the volume 10. A leakage hole 30 substantially perpendicular to the radial hole 11 and leading to the flange 2 makes the volume 10 communicate with the outside. During normal operation, the hole 11 is sealed by a seal 13 placed beneath the head of a screw which is screwed into a tapping in the hole 11.

To check sealing, the screw 12 is unscrewed. If a hissing noise is heard, gas is leaking out of the volume 10 at the seal 6. The check is repeated by unscrewing the other screw.

Figure 2:
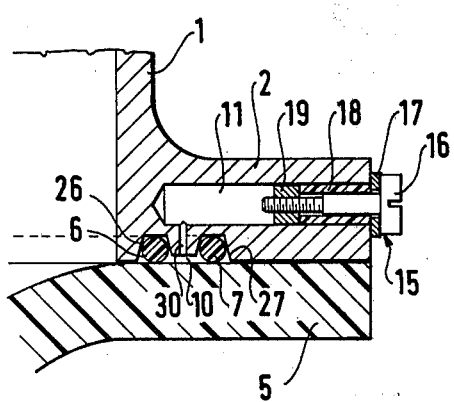
FIG. 2 is a partial schematic cross-section illustrating a flange connection which includes leak checking apparatus in accordance with the invention.

In FIG. 2 which illustrates the apparatus in accordance with the invention, the screw 12 and the seal 13 of FIG. 1 are replaced by a cap 15 screwed into a plug, this making tapping of the hole 11 unnecessary. The cap is made of a screw 16, a sealing washer 17, a tubular elastic elastic seal 18 and a nut 19. The screw 16 whose head may be of any shape is threaded only at its end, while the portion near its head is smooth to provide sealing with the tubular seal 18 through which it passes. The tubular seal 18 has a slightly smaller outside diameter than the diameter of the hole 11 and is clamped between the washer 17 and the nut 19.

To close the hole 11 and hence the volume 10 located between the two seals 6 and 7, the cap assembly 15 is inserted in the hole 11 and the screw 16 is tightened. The seal 18 which is made e.g. of rubber and which is compressed between the nut 19 and the washer 17 provides sealing.

The nut 19 is prevented from rotating e.g. by glueing it to the seal 18. Clamping the nut 19 provides enough friction of the seal 18 against the sides of the hole to keep the assembly in place even if a large leakage causes a pressure of several bars at the nut.

To check sealing, the screw 16 must be loosened. If hissing is heard during unscrewing, gas is leaking from the volume 10 and hence at the seal 6. Contrary to the prior art, such an apparatus does not need any tapping in a bulky flange.

Figure 3:
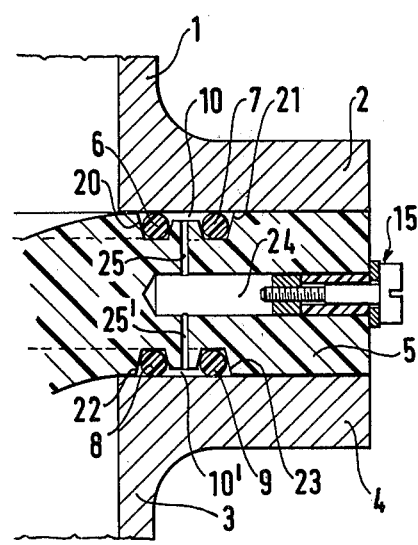
FIG. 3 is a partial schematic cross-section illustrating a flange connection which includes a variant of the leak checking apparatus in accordance with the invention.

The variant illustrated in FIG. 3 makes use of the insulator 5 inserted between the flanges.

Here, the flanges 2 and 4 have no grooves like those in FIGS. 1 and 2. In contrast, due to the fact that the insulator 5 is made of a moulded synthetic substance, grooves 20, 21, 22, 23 and volumes 10 and 10' are directly cast by suitably arranging cores in the mould. A slightly conical metal core also makes it possible to cast a radial hole 24 directly in the insulator 5. It is then necessary only to drill two small diameter holes 25 and 25' which communicate perpendicularly with the radial hole 24 to connect the volumes 10 and 10' with the hole 24. A cap 15 analogous to the one described in FIG. 2 makes it possible to close the hole 24.

In this variant, no radial holes are machined in the flanges. The holes in the flanges and their sets of machined grooves are replaced by a single radial hole and a set of grooves in the insulator all of which can be cast except for the leakage holes 25 and 25' which still have to be machined.

If there is large leakage at the defective seal, the pressure that prevails behind the nut 19 can reach several bars and when the screw is loosened, there is a danger of the cap being sharply blown out from its orifice. This can be dangerous to the operator.

To avoid this danger, a leak is formed to reduce the pressure before the elastic seal is completely removed.

Figure 4:
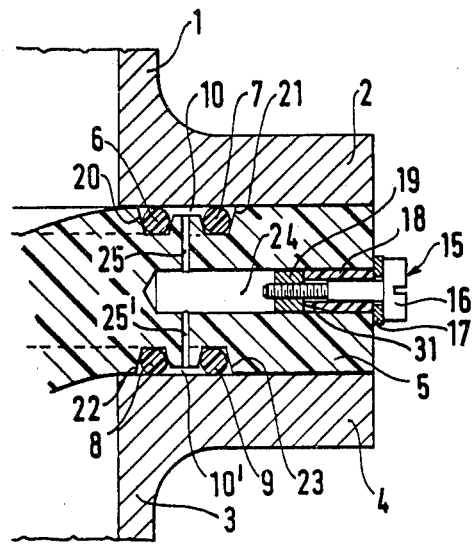
FIG. 4 illustrates a variant of the apparatus of FIG. 3, which variant includes a notched elastic seal.
Figure 5:
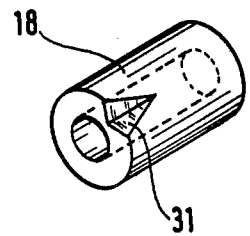
FIG. 5 is a perspective view of the notched seal illustrated in FIG. 4.

For this purpose, the tubular elastic seal is notched (31, FIGS. 4 and 5).

In a variant, the smooth hole is slotted (32, FIGS. 6 and 7) in the neighbourhood of its end which communicates with the outside.

FIG. 4 illustrates an embodiment of the apparatus, which embodiment is identical to that of FIG. 3, the only difference being that the seal 18 has a notch 31 at its end which comes into contact with the nut 19.

By way of example, if the length of the seal is 10 to 15 mm, the length of the notch is about 5 mm. More generally, the length of the notch lies between half and one third of the length of the seal before compression. When the screw 16 is tightened, the seal is compressed and the notch is filled in. When the screw 16 is loosened, the notch opens, its edges moving apart, and the pressure that prevails behind the cap 15 pushes it, but after the cap has traveled, the pointed upper portion of the notch reaches the outlet of the hole 24, the gas escapes thus lowering the pressure, before the cap is removed thereby avoiding its being blown out.

The seal, of which a perspective view is shown in FIG. 5 can be obtained by moulding and the notch has a conical or pyramid shape to facilitate compression of the seal without excessive stress, the pyramid having only two ridges.

More precisely, the notch results from the intersection of the cylindrical seal with a cone or a pyramid whose axis is outside the cross-section of the cylinder of the seal.

Figure 6:
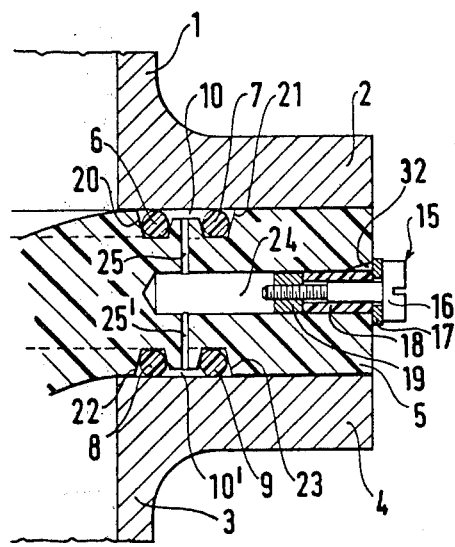
FIG. 6 is a variant of the apparatus of FIG. 3, which variant includes a notch in an otherwise smooth hole.
Figure 7:
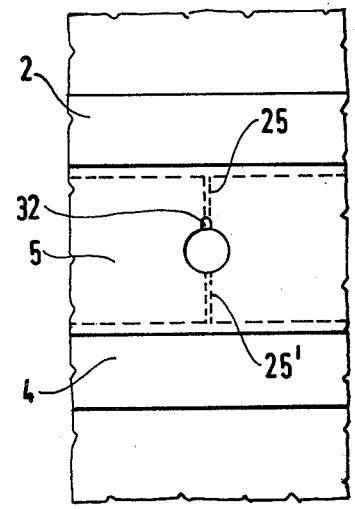
FIG. 7 is a front view of the notched hole of FIG. 6.

The same result is obtained with the variant of FIGS. 6 and 7, the seal 18 is cylindrical and a notch 32 is milled at the outer portion of the hole 24. When the screw 16 is tightened the seal is compressed, deformed and made to partially or completely occupy the notch 32. When the screw 16 is loosened, the friction of the seal against the walls is insufficient to withstand the pressure; the cap starts to leave its recess, but when the bottom of the seal reaches the inner portion of the notch 32, the gas escapes via the notch whereas part of the seal still bears against the walls of the hole 24, and the cap is not blown out of the orifice.

The notch, whose length lies between half and one third of the length of the seal before compression, can be obtained by milling or drilling obliquely relative to the tightening plane; the edges are rounded off so as not to start a tear in the seal; a conical mill can be used whose top has a small angle, the axis of the mill being inside the cross-section of the hole 24. This leads to an obtuse angle for intersection with the hole 24.

The controlled leak apparatus of which various embodiments have just been described allows sealing to be checked or leakage to be detected economically, when assembling in the works or on the work site; this is done by tightening the screws 16 fully home then loosening by a few turns to provide sealing with slight friction of the seal 18 against the walls. If there is a leak, the pressure rises in the hole 24 and pushes the cap 15 until the hole 24 communicates with the atmosphere; a protruding cover indicates leakage. This method of detecting leakage makes it unnecessary to use special tooling such as water pressure gauges for detection.

Of course, the controlled leak apparatus also applies to the case where the grooves in which the seals 6, 7, 8 and 9 are recessed are cut not in the insulator 5 but in the flanges 2 and 3 as described with reference to the embodiment illustrated in FIG. 2.

Figure 8:
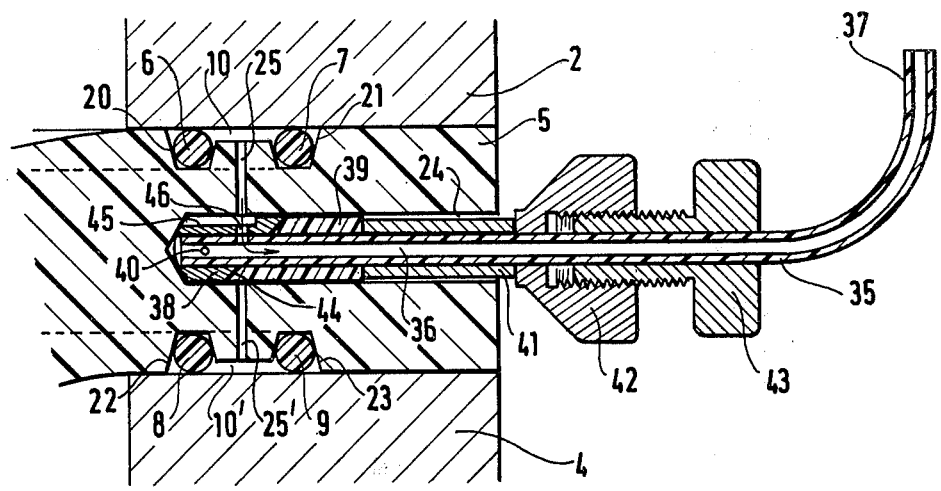
FIG. 8 illustrates a cross-section of a tool for detecting at which seal there is a leak.

If the apparatus used to detect leakage at the seals 6 and 8 has only one cap, ejection of the cover shows that there is a leak, but to avoid having to remove the flanges 2 and 4, a tool can be used which reveals the origin of the leak; FIG. 8 illustrates this tool installed in the hole 24 in a similar view to FIGS. 4 and 6, but on a larger scale.

This tool includes a pipe 35 with a rectilinear portion 36 and a curved portion 37; a hollow nut 43 whose thread points towards the rectilinear portion 36 and whose head has flats or a knurled portion is fixed e.g. by brazing on the end of the rectilinear portion 36 nearest the rounded portion 37.

Figure 9:
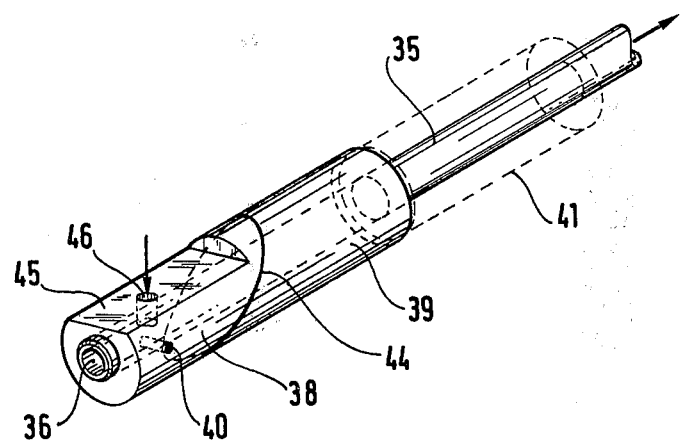
FIG. 9 is a perspective view of a component of the tool of FIG. 8.

A cylindrical sleeve 38 (FIG. 9) with a bevel 44 on one side and a flat 45 on the other side is fitted to the open end of the portion 36 and is held thereon by a pin 40; the bevel is at an angle of about 40° to the axis of the tube. A hole 46 makes the flat 45 communicate with the inside of the pipe 35.

In the figure, the sleeve is positioned with the flat adjacent a hole 25 and the bevel adjacent a hole 25'.

A resilient tubular rubber seal 39 whose inside diameter is very slightly smaller than the outside diameter of the tube 35 and whose outside diameter is slightly smaller than that of the hole 24 and which has a bevel identical to that of the sleeve is fitted on the pipe so as to be adjacent the sleeve.

Lastly, a pipe 41 slides freely on the tube 36 and is driven by a knurled nut 42 which acts as a seal-clamping unit and is screwed onto the hollow nut 43; it can compress seal 39.

The flat 45 of the sleeve 38 points in the same direction as the bend 37 of the pipe 35 so as to make it easier to align the flat in the hole 24; hence the seal 39 is adjacent the hole 25 or 25'.

Having detected a leak at the outlet of the cap 15 via the seals between the flange 2 and the insulator 5 and/or between the flange 4 and the insulator 5, the origin of the leak is sought; to do this, the cap 15 is completely removed and the rectilinear portion of the above-described tool is inserted in the hole thus left free, the knurled nut 42 being tightened and releasing the seal 39; with the tool held fully home in the bottom of the hole 24 and the bend 37 pointing towards the tube whose sealing is to be tested, loosening the nut 42 moves the pipe 41 from right to left, making it press against the seal 39 which closes the hole 25' and prevents it from communicating with the outside. Thus, only the gas which comes from the hole 25 can pass through the tube 35 via the zone left free by the flat 45; all that is needed is to connect the outlet 37 to a water pressure gauge, not illustrated, to check whether the leak comes from the seal 6.

Turning the nut 42 then releases the seal which resumes its original position. The tool can then rotate freely through 180°. The pipe 37 points towards the flange 4; compressing the seal 39 closes the hole 25; this prevents communication therewith from the outside and makes the hole 25' communicate with the water pressure gauge; then the seal is checked to see whether the leak comes therefrom between the flange 4 and the insulator 5.

This tool serves exclusively to detect the origin of the leak.

I claim:

1. Apparatus for checking for leaks between the connection flanges of two portions of metal-clad electric gear, said flanges being sealed by means of two seals disposed concentrically in series on the facing surfaces of the flanges, said electric gear being filled with compressed gas, the improvement comprising a smooth bore hole in communication with the internal volume lying between the two seals and leading to the exterior of the metal-clad electric gear, and an axially compressible resilient cylindrical seal within said smooth hole, a screw projecting through said compressible resilient cylindrical seal from the exterior, said screw being threaded only at its end, leaving a smooth surface portion near the head thereof and projecting within said resilient cylindrical seal, a nut threaded to said threaded screw portion at its end and means for preventing rotation of said nut but allowing axial movement of the nut within said bore hole such that rotating said screw relative to said nut causes said resilient cylindrical seal to increase in diameter during axial compression for effecting fluid-tight sealing between said resilient cylindrical seal and both the smooth surface portion of said screw and said smooth bore hole.

2. Apparatus according to claim 1, wherein the smooth hole is provided in the periphery of one of the flanges.

3. Apparatus according to claim 1, wherein an insulator is inserted between the two flanges and wherein the smooth hole is located in the periphery of the insulator, and communicates between the outside and internal volumes between serially arranged sealing rings on both sides of the insulator.

4. Apparatus according to claim 3, wherein the smooth hole in the insulator is formed by a moulding core when the insulator is cast.

5. Apparatus according to either one of claims 3 or 4, wherein the seal rings of the facing surfaces are disposed in grooves formed in the insulator.

6. Apparatus for checking for leakage according to claim 1, wherein at least one of the smooth hole and the resilient seal is notched so that a leak is produced when the screw is loosened.

7. Apparatus according to claim 6, wherein the notch is in the seal and is on the side nearest the internal volume.

8. Apparatus according to claim 7, wherein the notch is shaped like a portion of a cone.

9. Apparatus according to claim 7, wherein the notch is shaped like a portion of a pyramid.

10. Apparatus according to claim 7, wherein the notch is within the seal and has a length lying between one third and a half of the seal length before compression.

11. Apparatus according to claim 6, wherein the notch is cut in the end of the hole situated on the side nearest the outside of the metal casing.

12. Apparatus according to claim 11, wherein the notch is milled obliquely with a cylindrical mill, the ridges between the notch and the hole being machined away.

13. Apparatus according to claim 11, wherein the notch is milled with a conical mill.

14. Apparatus according to claim 11, wherein the length of the notch lies between a half and one third of the length of the seal before it is compressed.

15. Apparatus for checking for leaks between the connection flanges of two portions of metal-clad electric gear, said flanges being sealed by means of two seals disposed concentrically in series on the facing surfaces of the flanges, said electric gear being filled with compressed gas, the improvement comprising a smooth bore hole in communication with the internal volume lying between the two seals and leading to the exterior of the metal-clad electric gear, and an axially compressible resilient cylindrical seal plugging said smooth hole as a result of increased diameter during axial compression for frictional lock therein, and wherein an insulator is inserted between said two flanges, said smooth hole is located in the periphery of the insulator and extends parallel to said two flanges and communicates between the outside and internal volumes between serially arranged sealing rings on both sides of the insulator through one hole projecting from said smooth hole to one side of the insulator and another hole projecting from said smooth hole to the other side of the insulator, and wherein said apparatus further comprises a pipe extending from the exterior into said smooth hole, said pipe bearing said axially compressible resilient seal in tubular form surrounding said pipe, and wherein a radial hole within said pipe communicates the interior of the pipe with one of said holes within said insulator leading to an internal volume between the serially arranged sealing means on one side of said insulator while said axially compressible cylindrical seal closes off the other hole within said insulator leading to the other side of said insulator.

16. Apparatus according to claim 15, wherein a pressure gauge communicates with said volume via said pipe, and said pipe further comprises a unit for axially compressing said resilient tubular seal.

17. Apparatus according to claim 16, wherein said pipe bears a sleeve, said sleeve has a bevelled end surface, and said seal has a bevelled end surface corresponding to that of the bevelled surface of said sleeve which presses against the bevelled surface of said sleeve at a point intersecting said holes extending through said insulator and leading to the interior volumes between serially arranged sealing means on opposite sides of said insulator, such that by rotating said pipe, said sleeve and said resilient tubular seal communication is selectively made to a volume on one side of said insulator, while the volume on the opposite side of said insulator is sealed off by said resilient tubular seal.

18. Apparatus according to claim 16, wherein said sleeve has a flat at a point thereon wherein a radial hole on the sleeve communicates with the inside of the pipe by way of the radial hole within said pipe.

* * * * *